Jan. 7, 1936.                O. L. HOTZ                2,026,975
BOX
Filed March 19, 1935
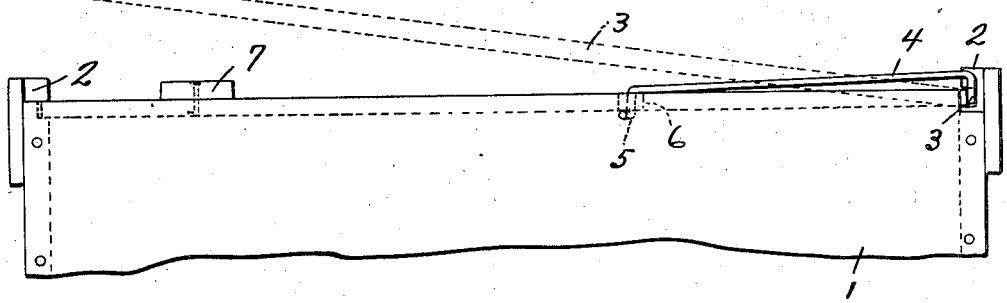
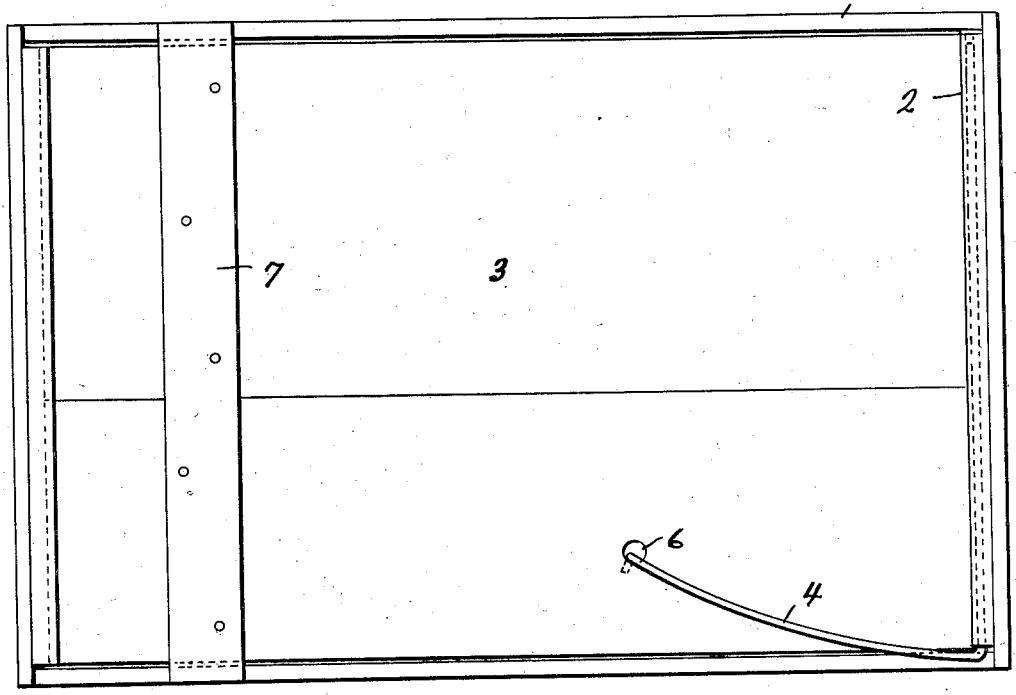
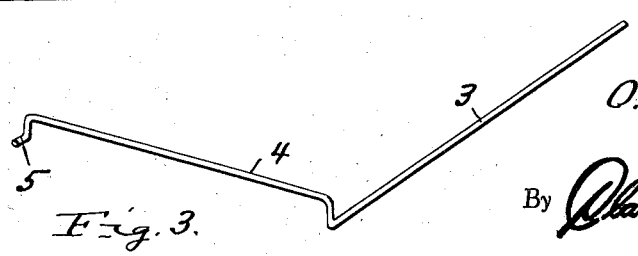
Inventor
O. L. Hotz
By Clarence A. O'Brien
Attorney Patented Jan. 7, 1936

2,026,975

UNITED STATES PATENT OFFICE 2,026,975

BOX

Oscar L. Hotz, Shawano, Wis.

Application March 19, 1935, Serial No. 11,860

2 Claims. (Cl. 217—56)

This invention relates to a box, the general object of the invention being to provide means whereby the cover of the box can be readily put in place and removed, with means whereby the cover can be readily held in covering position.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a fragmentary elevation showing the cover in open position in dotted lines and also showing the cover in closed position.

Figure 2 is a top plan view of Figure 1.

Figure 3 is a view of the wire means for holding the cover in closed position.

In this drawing the box is shown at 5 and at the upper end of its end pieces is provided with a groove 2 for receiving the ends of the lid or cover 3. The length of the lid or cover is less than the distance between the outer walls of the grooves so that the cover can be set in position with one end fitting in one of the grooves, said end bearing against the outer wall of the groove and then by pushing the cover or lid forwardly the other end will enter the other groove. In order to hold the cover in this position a wire or rod 3 is inserted in the first groove between the outer wall thereof and the adjacent end of the cover or lid so that the lid cannot be moved toward the wire a sufficient distance to bring its other end out of the other groove. After the wire is placed in position its bent end 4 is bent over the lid or cover and the hook 5 at the front of its bent end is placed in a hole 6 formed in the cover which holds the box in the position shown in Figure 2 so that the wire or rod cannot be pulled from the groove unless it is bent to move the hook 5 out of the hole 6. Then the wire or rod can be pulled from the groove after which the lid or cover is slid into the groove the full width of the groove and when this is done the other end of the cover is out of the other groove so that it can be lifted from the box.

In order to prevent the lid or cover to drop entirely into the box while it is being put in place I provide a transverse strip 7 on the upper face thereof the ends of which will engage the side walls of the box when the lid is in position as shown in Figures 1 and 2.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with a box having a lid, said box having grooves on the inner faces of its end pieces for receiving the ends of the lid, the length of the lid being less than the distance between the outer walls of the two grooves, whereby by pushing one end of the lid into one groove the other end of the lid can be placed opposite the other groove and then the lid moved forwardly to place said other end in said other groove and an elongated member movably fitting in one of the grooves between an end of the lid and an outer wall of said groove for holding the lid in place, said member having an angle extension at one end forming a handle.

2. In combination with a box having a lid, said box having grooves on the inner faces of its end pieces for receiving the ends of the lid, the length of the lid being less than the distance between the outer walls of the two grooves, whereby by pushing one end of the lid into one groove the other end of the lid can be placed opposite the other groove and then the lid moved forwardly to place said other end in said other groove and a member for fitting between an end of the lid and a side wall of one of the grooves for holding the lid in place, said member including a long limb adapted to be placed in the groove and a bent end portion of resilient material having a hook at its extension for engaging a hole in the lid.

OSCAR L. HOTZ.